United States Patent [19]

Esterowitz et al.

[11] Patent Number: 4,969,154

[45] Date of Patent: Nov. 6, 1990

[54] ROOM-TEMPERATURE, FLASHPUMPED, 2 MICRON SOLID STATE LASER WITH HIGH SLOPE EFFICIENCY

[75] Inventors: Leon Esterowitz, Springfield, Va.; Gregory J. Quarles, Bowie, Md.; Charles L. Marquardt, Great Falls, Va.

[73] Assignee: The United States of America as represented by the Secretary of the Navy, Washington, D.C.

[21] Appl. No.: 455,031

[22] Filed: Dec. 22, 1989

[51] Int. Cl.$^5$ .............................................. H01S 3/14
[52] U.S. Cl. ........................................ 372/68; 372/41
[58] Field of Search ............................. 372/39, 41, 68

[56] References Cited

U.S. PATENT DOCUMENTS 4,811,349  3/1989  Payne et al. ............................ 372/41
4,841,530  6/1989  Chai et al. ............................. 372/41

OTHER PUBLICATIONS

Publication, High Efficiency 2.09 μm Flashlamp-Pumped, Laser by G. J. Quarles, Annette Rosenbaum, Charles L. Marquardt, and Leon Esterowitz, Applied Physics Letters 55(11), Sep. 11, 1989.

Publication, Thulium YAG Laser Operation at 2.01 μm, by Mark E. Storm, Donald J. Gettemy, Norman P. Barnes, Patricia L. Cross and Milan R. Kokta, Applied Optics, vol. 28, No. 3, Feb. 1, 1989.

*Primary Examiner*—Frank Gonzalez
*Assistant Examiner*—Susan S. Morse
*Attorney, Agent, or Firm*—Thomas E. McDonnell; George Jameson

[57] ABSTRACT

A room temperature solid state laser for producing a laser emission at a wavelength of substantially 2 microns is disclosed. In a preferred embodiment, the laser comprises: a laser crystal having a host crystal material doped with an effective percent concentration of $CR^{3+}$ sensitizer ions and with an effective percent concentraton of $Tm^{3+}$ activator ions; and a flashpump for exciting the laser crystal to produce a laser emission at substantially 2 microns at a slope efficiency of at least 2 percent.

21 Claims, 2 Drawing Sheets ative ions. The host crystal material can be a crystal material selected from the group consisting of YAG, YSGG, GSGG, GSAG, YSAG, YAlO, GGG, YGG, LLGG and mixtures thereof.

ROOM-TEMPERATURE, FLASHPUMPED, 2 MICRON SOLID STATE LASER WITH HIGH SLOPE EFFICIENCY

BACKGROUND OF THE INVENTION

1. Field of the Invention

The present invention relates to lasers and particularly to a flashpumped 2 micron solid state laser with high slope efficiency at or near room temperature.

2. Description of the Prior Art

Development of room temperature solid state lasers in the two micron spectral range has received renewed attention recently because of potential applications in medicine and optical communications. Q-switched 2 micron lasers are of particular importance since they can provide efficient pump lines for tunable parametric oscillators covering the entire 2-12 micron region.

Demonstrations of laser action around 2.0 microns, using the $^5I_7$–$^5I_8$ transition of $Ho^{3+}$, as well as the $^3F_4$–$^3H_6$ transition of $Tm^{3+}$, appeared among the early reports on rare earth ion lasers. One difficulty with both of these 2.0 micron transitions is due to the fact that the terminal laser level is only separated from the ground state by a Stark splitting on the order of $10^2$–$10^3$ cm$^{-1}$. Thus, the early laser demonstrations were performed at cryogenic temperatures in order to reduce the Boltzmann population of the lower laser level.

Efficient flashlamp pumping of the $Tm^{3+}$ and $Ho^{3+}$ was accomplished by the addition of a sensitizer ion, such as $Cr^{3+}$ or $Er^{3+}$. A number of concentration and/or temperature-dependent energy transfer processes, both beneficial and detrimental, occur in these multiply-doped laser materials. Knowledge of these effects has been utilized previously in order to obtain efficient flashlamp-pumped room temperature (FPRT) 2 micron laser operation from $Ho^{3+}$.

A recent study has been reported on a cryogenic 2.01 micron Cr:Tm:YAG laser that has a maximum slope efficiency of 0.48% with a threshold of 25 J at 130 K, and thresholds have been projected on the order of 100 J for flashlamp pumped room temperature operation. This previous study has been reported in an article entitled "Thulium YAG laser operation at 2.01 μm" by M. E. Storm, D. J. Gettemy, N. P. Barnes, P. L. Cross and M. P. Kokta, published in Appl. Opt., Vol. 28, No.3, pp. 408-409 (1 Feb.1989). However, this recent study on the cryogenic 2.01 micron Cr:Tm:YAG laser has suggested that achievement of similar flashpumped room temperature efficiencies for $Tm^{3+}$ may not be possible.

OBJECTS OF THE INVENTION

Accordingly, one object of the invention is to provide an improved, high efficiency, flashpumped, 2 micron solid state laser.

Another object of the invention is to provide a $Cr^{3+}$—and $Tm^{3+}$—doped solid state laser material.

Another object of the invention is to provide a $Cr^{3+}$—and $Tm^{3+}$—doped crystal laser material, wherein the crystal laser material is selected from the group consisting of YAG, YSGG, GSGG, GSAG, YSAG, YAlO, GGG, YGG, LLGG and mixtures thereof.

Another object of the invention is to provide a $Cr^{3+}$—and $Tm^{3+}$—doped solid state laser with at least a 2% slope efficiency, but preferably with at least a 4% slope efficiency.

Another object of the invention is to provide a flashlamp-pumped, solid state laser having a host crystal material selected from the group consisting of YAG, YSGG, GSGG, GSAG, YSAG, YAlO, GGG, YGG, LLGG and mixtures thereof, and with the host crystal material being doped with an effective percent concentration of $Cr^{3+}$ sensitizer ions and with an effective percent concentration of $Tm^{3+}$ activator ions.

Another object of the invention is to provide a Cr:Tm:YAG 2.01 micron, flashpumped laser with at least a 4% slope efficiency.

Another object of the invention is to provide an efficient flashpumped 2 micron laser that operates at room temperature.

Another object of the invention is to efficiently generate a laser emission at a wavelength of substantially 2 microns with a high slope efficiency at or near room temperature.

A further object of the invention is to provide a pulsed, flashpumped YAG laser preselectively doped with $Cr^{3+}$ and $Tm^{3+}$ ions to produce laser emission pulses at a wavelength of substantially 2.01 microns.

SUMMARY OF THE INVENTION

These and other objects of the invention are achieved by providing a $Cr^{3+}$—and $Tm^{3+}$—doped host crystal laser material and a solid state laser which utilizes such doped host crystal laser material to generate a laser emission at substantially 2 microns with a high slope efficiency at or near room temperature. The room-temperature solid state laser comprises a laser crystal having a host crystal material doped with an effective percent concentration of $Cr^{3+}$ sensitizer ions and with an effective percent concentration of $Tm^{3+}$ activator ions, and a flashlamp for exciting the laser crystal to produce a laser emission at substantially 2 microns at a slope efficiency of at least 2%.

The host crystal material can be a crystal material selected from the group consisting of YAG, YSGG, GSGG, GSAG, YSAG, YAlO, GGG, YGG, LLGG. However, it should be realized that the host crystal material could also be comprised of suitable mixtures or combinations of the crystals listed in the above-recited group of crystal materials. The selected host crystal material is doped with an effective percent concentration of $Cr^{3+}$ sensitizer ions between 0.3% and 3.0% and with an effective percent concentration of $Tm^{3+}$ activator ions between 4% and 12% to enable the laser crystal to produce the laser emission at substantially 2 microns at a slope efficiency of at least 2%, and preferably at a slope efficiency of at least 4%.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
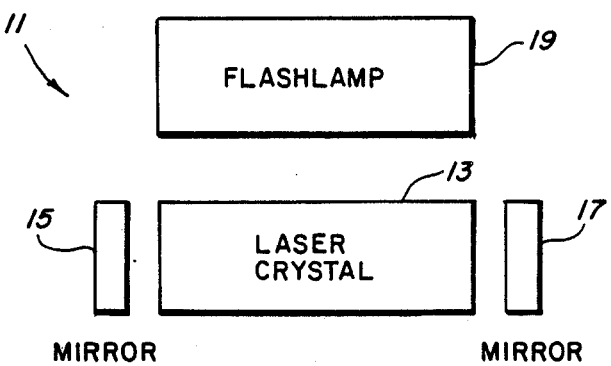
FIG. 1 illustrates a preferred embodiment of the invention.

Referring now to the drawings, FIG. 1 illustrates a chromium-and thulium-doped laser in accordance with the invention. Laser 11 is comprised of a laser rod or crystal 13 placed between a pair of aligned mirrors 15 and 17, or other cavity forming means, to form a resonator. An excitation means, such as a flashlamp 19 is placed in close proximity to the laser rod 13 to pump the laser rod or crystal 13. The flashlamp 19 can be pulsed by means (not shown) to emit pulses of light at a pulse repetition frequency of, for example 1 Hz. The mirror 15 is highly reflective, while the mirror 17 is partially transmitting to a laser wavelength of 2.014 microns to provide the output coupling for the laser emission at 2.014 microns from the laser 11.

The laser crystal or rod 13 has a laser host crystal material (not shown) which is selected from the broad group consisting of YAG (yttrium aluminum garnet), YSGG (yttrium scandium gallium garnet), GSGG (gadolinium scandium gallium garnet), GSAG (gadolinium scandium aluminum garnet), YSAG (yttrium scandium aluminum garnet), YALO (yttrium aluminum oxygen), GGG (gadolinium gallium garnet), YGG (yttrium gallium garnet), LLGG (lanthanum lutetium gallium garnet). As mentioned before, the host crystal material could also be comprised of mixtures or combinations of this group of crystal materials. The preferred group of host crystal materials is comprised of YAG, YSAG and YSGG, and the most preferred host crystal material is YAG.

The selected host crystal material of the laser crystal or rod 13 is doped with an effective percent concentration of $Cr^{3+}$ (chromium) sensitizer ions and with an effective percent concentration of $Tm^{3+}$ (thulium) activator ions. When the laser rod 13 is pumped or excited by a light pulse from the flashlamp 19, the laser rod 13 develops an output pulse of laser emission with an associated slope efficiency.

The chief characteristic or requirement of a selected host crystal material is that it must have the capability of easily accepting a transition metal ion (such as $Cr^{3+}$ in this description) and a lanthanide or trivalent rare earth ion (such as $Tm^{3+}$ in this description). The dopant $Cr^{3+}$ ions and $Tm^{3+}$ ions must go into the host crystal material without significantly distorting the lattice of the host crystal material so that the quality of the host crystal material remains high.

The $Cr^{3+}$ ions are the sensitizer ions and their concentration is chosen so that there is good absorption into the host crystal material of the excitation pump from the flashlamp 19. If the $Cr^{3+}$ concentration is too low, there will be poor coupling of the excitation from the flashlamp 19 into the host crystal material. However, if the $Cr^{3+}$ concentration is too high, it will cause thermal lensing and other deleterious effects to the performance 17 of the laser crystal 13. The term "effective percent concentration of $Cr^{3+}$ ions" means that the concentration of $Cr^{3+}$ ions in the host crystal material is sufficient to cause close to a 100% absorption of the excitation from the flashlamp 19 into the host crystal material, in addition to achieving uniform pumping throughout the laser host crystal material. The optimum $Cr^{3+}$ concentration will vary with the dimensions of the host crystal material of the laser crystal or rod 13. Since uniform absorption or pumping is desirable, a lower $Cr^{3+}$ concentration should be used for a larger diameter rod 13, while a higher $Cr^{3+}$ concentration should be employed for a smaller diameter rod 13.

The $Tm^{3+}$ ions are the activator ions which cause the lasing from the laser crystal 13. The $Tm^{3+}$ concentration must be high enough so that an efficient cross-relaxation process (to be explained), which populates the upper laser level, takes place. In addition, the $Tm^{3+}$ and $Cr^{3+}$ concentrations must be high enough so that an energy transfer between the $Cr^{3+}$ sensitizer ions and the $Tm^{3+}$ activator ions is efficient. However, if the $Tm^{3+}$ concentration is too high, losses will increase and the performanance of the laser crystal 13 will suffer due to ground state absorption since the lower laser level is the ground state. The term "effective percent concentration of $Tm^{3+}$ ions" means that the concentration of $Tm^{3+}$ ions in the host crystal material is sufficient to enable a cross-relaxation process to be achieved with close to 100% effectiveness.

When the host crystal material is selected from the above-listed broad group of crystals (YAG, YSGG, GSGG, GSAG, YSAG, YAlO, GGG, YGG and LLGG) and is doped with an effective percent concentration of $Cr^{3+}$ sensitizer ions between about 0.3% and about 3% and with an effective concentration of $Tm^{3+}$ activator ions between about 4% and about 12%, a light pulse from the flashlamp 19 enables the laser rod 13 to produce a pulse of laser emission at substantially 2 microns at a slope efficiency of at least 2%.

When the host crystal material is selected from the preferred group of YAG, YSAG and YSGG crystals and is doped with a preferred effective percent concentration of $Cr^{3+}$ sensitizer ions between about 0.3% and about 1.5% and with a preferred effective percent concentration of $Tm^{3+}$ activator ions between about 4.5% and about 7.5%, a light pulse from the flashlamp 19 enables the laser rod 13 to produce a pulse of laser emission at substantially 2 microns at a slope efficiency of substantially 4%.

When the host crystal material is YAG and is doped with a most preferred effective percent concentration of $Cr^{3+}$ sensitizer ions between about 0.6% and about 0.9% and with a most preferred effective concentration of $Tm^{3+}$ activator ions between about 5% and about 6%, a light pulse from the flashlamp 19 enables the laser rod 13 to produce a pulse of laser emission at a wavelength of substantially 2.014 microns and at a slope efficiency of substantially 4.5%.

It should be noted at this time that, by the use of the term of "percent concentration of $Cr^{3+}$ sensitizer ions", it is meant the percent of substitution of the $Cr^{3+}$ ions for the aluminum ions in YAG, for the scandium and gallium ion combination in YSGG, for the scandium and gallium ion combination in GSGG, for the scandium and aluminum ion combination in GSAG, for the scandium and aluminum ion combination in YSAG, for the aluminum ions in YAlO, for the gallium ions in GGG, for the gallium ions in YGG or for the lutetium and gallium ion combination in LLGG.

Similarly, by the use of the term of "percent concentration of $Tm^{3+}$ activator ions", it is meant the percent of substitution of the $Tm^{3+}$ ions for the yttrium ions in YAG, for the yttrium ions in YSGG, for the gadolinium ions in GSGG, for the gadolinium ions in GSAG, for the yttrium ions in YSAG, for the yttrium ions in YAlO, for the gadolinium ions in GGG, for the yttrium ions in YGG or for the lanthanum ions in LLGG.

It should be noted at this time that the selected host crystal material is doped with an effective percent concentration of $Cr^{3+}$ sensitizer ions and with an effective percent concentration of $Tm^{3+}$ activator ions by applying techniques well known to those skilled in the art and, hence, requires no further description of such techniques.

A more detailed description of an exemplary composition of the laser crystal or rod 13 and the operation of the laser rod 13, as well as the operation of the laser 11 of FIG. 1, will be given by now referring to FIG. 2.

Figure 2:
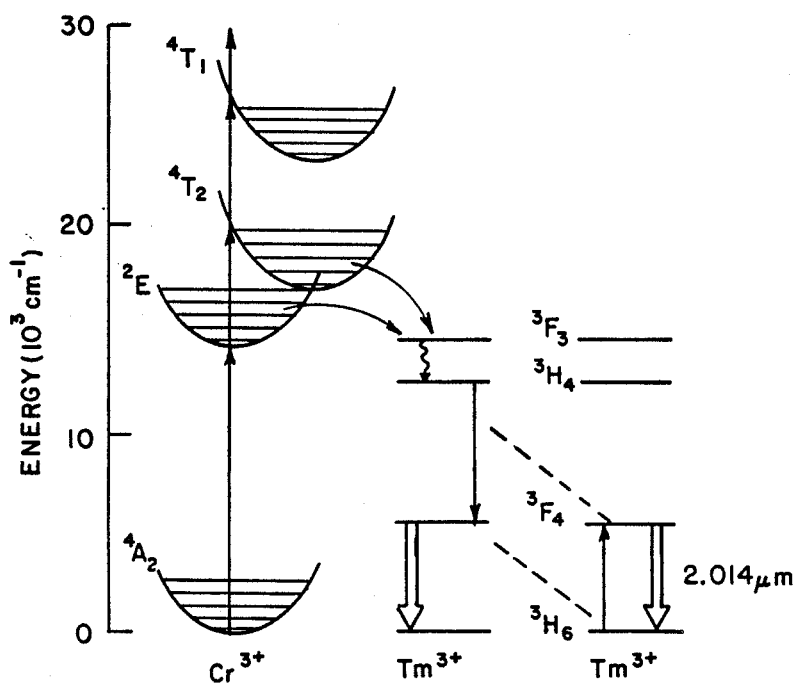
FIG. 2 illustrates the various energy levels of a chromium-and thulium-doped laser crystal.

FIG. 2 illustrates the various energy levels of the chromium ($Cr^{3+}$) and thulium ($Tm^{3+}$) doped laser crystal or laser rod 13 of FIG. 1. More specifically, FIG. 2 is a diagram of the various energy levels for the $Cr^{3+}$ ions in the laser rod 13, which can be comprised of an exemplary YAG host material. The importance of the $Cr^{3+}$ to $Tm^{3+}$ transfer efficiency to the 2 micron laser operation can be seen from the pumping scheme illustrated in FIG. 2.

In operation, each light pulse from the flashlamp is absorbed in the $^4T_1$ and $^4T_2$ bands of the $Cr^{3+}$ ions. After a nonradiative decay to and within the $4T_2$ and $^2E$ levels or states of the $Cr^{3+}$ ions, the excitation is transferred from the $Cr^{3+}$ ions to the $^3F_3$ and $^3H_4$ states of the $Tm^{3+}$ ions by way of dipole-dipole interactions. Nonradiative decay of the $^3F_3$ level places virtually all of the excited $Tm^{3+}$ ions in the $^3H_4$ state. Each excited $Tm^{3+}$ ion then interacts with a ground-state $Tm^{3+}$ in a cross-relaxation process which gives rise to two $Tm^{3+}$ ions in the $^3F_4$ state. This $^3F_4$ state or level is the upper laser level. Lasing or photon emission then occurs at about 2.014 microns as the excited $Tm^{3+}$ ions in the $^3F_4$ upper laser level decay to the $^3H_6$ lower laser level.

Cross-relaxation is a near-resonant nonradiative process in which an excited $Tm^{3+}$ ion in the $^3H_4$ state decays to the $^3F_4$ state and a neighboring ground-state $Tm^{3+}$ ion is promoted to the $^3F_4$ level, accompanied by the emission of photons. The obvious advantage of this cross-relaxation process or operation is that a single $Tm^{3+}$ ion excited to the $^3H_4$ level generates two $Tm^{3+}$ ions in the $^3F_4$ upper laser level. Experiments have shown that the probability of the $Tm^{3+}$ cross-relaxation occurring is negligible for concentrations of $Tm^{3+}$ ions less than about 2%, but approaches unity for concent of $Tm^{3+}$ ions greater than about 5%.

A room temperature laser emission at substantially 2.014 microns at a high slope efficiency of substantially 4.5% was derived by the present applicants. In order to attain this high slope efficiency, the composition of the laser rod 13 was selected to be favorable for all of the processes involved in flashlamp pumping at room temperature. As previously discussed in relation to FIG. 2, these processes were: absorption of the flashlamp light in the $^4T_1$ and $^4T_2$ bands of $Cr^{3+}$, nonradiative transfer of the excitation from the thermally mixed $^4T_2/^2E$ levels of $Cr^{3+}$ to the $^3F_3$ levels of $Tm^{3+}$, and cross-relaxation among $Tm^{3+}$ ions to populate the $^3F_4$ upper laser level. The above-specified high 4.5 slope efficiency was attained by using the following parameters.

A laser rod 13 having a YAG ($Y_3Al_5O_{12}$) host material was selected. The YAG laser rod 13 was 5.0 mm in diameter and 76.3 mm in length. The rod ends were polished flat and parallel and had broad anti-reflection coatings centered at 2.0 microns. The laser cavity mirrors 15 and 17 of FIG. 1 are respectively disposed adjacent to the polished ends of the laser rod 13. The diffuse-reflecting pump cavity had a pumping length of 69 mm so that at least 91% of the rod length was pumped by the flashlamp.

Within the YAG laser rod 13, a $Cr^{3+}$ ion concentration of 5.6 times $10^{19}$ cm$^{-3}$ (which is about a 0.6% concentration of $Cr^{3+}$ sensitizer ions, as defined above) and a $Tm^{3+}$ concentration of 8.3 times $10^{20}$ cm$^{-3}$ (which is about a 6.0% concentration of $Tm^{3+}$ activator ions, as defined above) was chosen.

The $Cr^{3+}$ ion concentration of 5.6 times $10^{19}$ cm$^{-3}$ (or 0.6% concentration) was chosen in order to provide an optimized balance between the efficient absorption of the flashlamp light in the laser rod 13 and uniform pumping of the mode volume in the 5 mm diameter YAG laser rod 13. Changing the value of the $Cr^{3+}$ ion concentration had very little effect ($<5\%$) on the $Cr^{3+}$ to $Tm^{3+}$ transfer efficiency in YAG.

The $Tm^{3+}$ ion concentration of 8.3 times $10^{20}$ cm$^{-3}$ (or 6.0% concentration) was chosen to favor both the $Cr^{3+}$ to $Tm^{3+}$ energy transfer and the $Tm^{3+}$ cross relaxation processes. Previous work had shown that the $Cr^{3+}$ to $Tm^{3+}$ energy transfer was most efficient in a YAG host material, and that it occurs almost exclusively by a direct dipole-dipole interaction. The $Cr^{3+}$ to $Tm^{3+}$ transfer efficiency in the Cr:Tm:YAG material in the laser rod 13 was determined by measuring the $Cr^{3+}$ fluorescence following a pulsed laser excitation and was found to be 97.5%.

The doped laser rod 13 was pumped by a single simmered Xe flashlamp 19 having a 63.5 mm arc length, filled to 630 Torr, with a 4 mm bore diameter. The flashlamp 19 was pulsed at a pulse repetition frequency of one hertz (1 Hz) to obtain the output laser emission at substantially 2.014 microns at the high slope efficiency of substantially 4.5%.

As stated before, tests have shown that the probability of the $Tm^{3+}$ cross-relaxation was negligible for $Tm^{3+}$ concentrations less than about 2%, but approaches unity for $Tm^{3+}$ concentrations greater than about 5%. The 6% $Tm^{3+}$ used in this description takes full advantage of the $Tm^{3+}$ cross-relaxation process. However, increasing the $Tm^{3+}$ above this 6% level is not advantageous because of losses due to ground-state absorption of the 2.0 micron laser emission.

Figure 3:
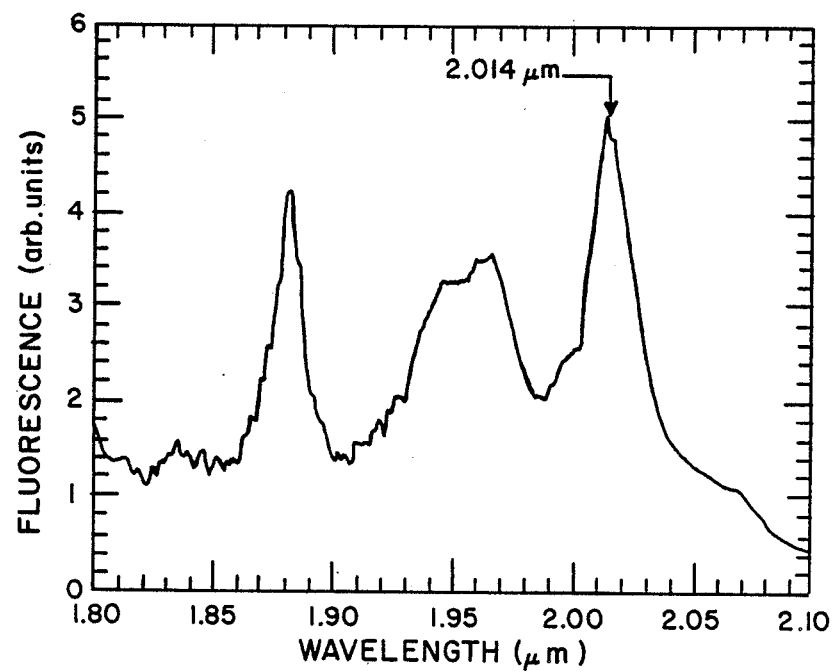
FIG. 3 illustrates the room temperature $Tm^{3+}$:YAG fluorescence spectrum.

FIG. 3 illustrates the room temperature $Tm^{3+}$:YAG fluorescence spectrum. More specifically, the room temperature $Tm^{3+}$:YAG fluorescence spectrum shown in FIG. 3 clearly indicates that the peak of the spectral gain distribution occurs when the laser emission from the laser crystal or rod 13 has a wavelength of 2.014 microns.

The wavelength of the emission from the laser rod 13 was measured with a 0.24 m grating spectrometer, and was determined to be 2.014 plus or minus 0.001 micron. Based on previous spectroscopic studies, this line is assigned to the transition originating from the lowest Stark level of the $^3F_4$ manifold (5556 cm$^{-1}$) and terminating on a $^3H_6$ Stark level which lies 588 cm$^{-1}$ above the ground state.

Figure 4:
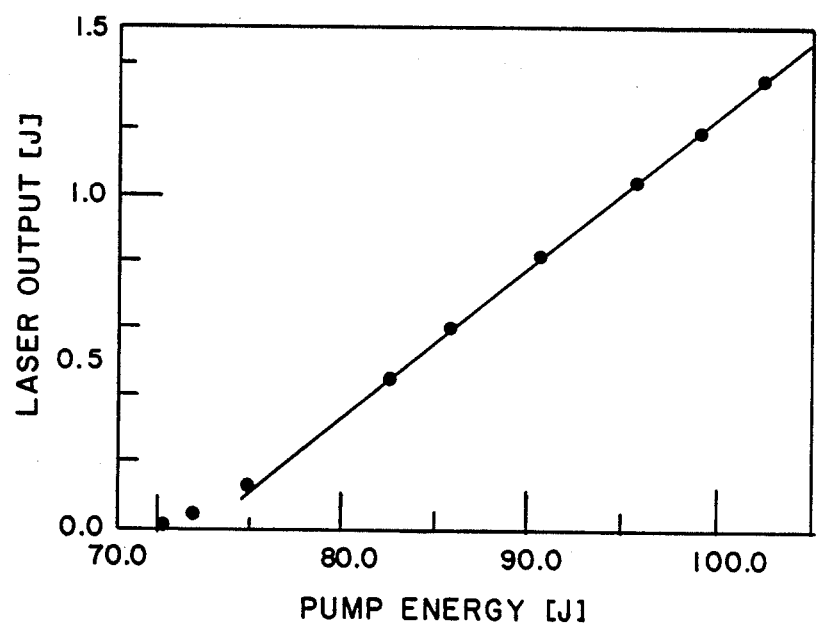
FIG. 4 illustrates an exemplary plot of the Cr:Tm:YAG laser output of FIG. 1 as a function of electrical energy supplied to the flashlamp of FIG. 1.

FIG. 4 illustrates an exemplary plot of the output of the Cr;Tm:YAG laser 13 of FIG. 1 as a function of the electrical energy supplied to the flashlamp 19 of FIG. 1, using an output coupler (95%) and pump pulse duration (1.4 msec) which resulted in the highest observed slope efficiency of 4.5%. Each data point in FIG. 4 is an average of 10 consecutive shots. The slope efficiency is calculated from a linear regression fit to data points corresponding to pump energies exceeding 75 J (joules).

Slope efficiency can be defined as the ratio of the change in the laser output energy to the change in the pump energy that produced the change in the laser output energy. For example, a 20 J change in pump energy (from 80 J to 100 J) produces a change of approximately 0.9 J (from about 0.3 J to about 1.2 J) in the laser output energy. Therefore, the calculated slope efficiency from such change in energy levels is approximately 0.045 or approximately 4.5%.

Therefore, what has been described in a preferred embodiment of the invention is a room-temperature solid state laser which comprises a laser rod or crystal having a host crystal material doped with an effective percent concentration of $Cr^{3+}$ sensitizer ions and with an effective percent concentration of $Tm^{3+}$ activator ions, and means, such as a flashlamp, for exciting the laser rod to produce a laser emission at a wavelength of substantially 2 microns and at a slope efficiency of at least 2%, but preferably with at least a 4% slope efficiency and most preferrably with a slope efficiency of substantially 4.5%. The 4% slope efficiency is an order of magnitude greater than that reported in the above-identified prior published articles of M. E. Storm and N. P. Barnes.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A solid state laser material comprising:
   a host crystal material capable of accepting $Cr^{3+}$ ions and $Tm^{3+}$ ions, said host material being selected from the group consisting of YAG, YSGG, GSGG, GSAG, YSAG, YAlO, GGG, YGG and LLGG;
   a dopant of $Cr^{3+}$ ions having an effective percent concentration of between about 0.3% and about 3% in said host crystal material; and
   a dopant of $Tm^{3+}$ ions having an effective percent concentration of between about 4% and about 12%

2. A solid state laser material comprising:
   a host crystal material capable of accepting $Cr^{3+}$ ions and $Tm^{3+}$ ions, said host material being comprised of a mixture of crystals selected from the group consisting of YAG, YSGG, GSGG, GSAG, YSAG, YAlO, GGG, YGG and LLGG;
   a dopant of $Cr^{3+}$ ions having an effective percent concentration of between about 0.3% and about 3% in said host crystal material; and
   a dopant of $Tm^{3+}$ ions having an effective percent concentration of between about 4% and about 12% in said host crystal material.

3. A solid state laser material comprising:
   a host crystal material capable of accepting $Cr^{3+}$ ions and $Tm^{3+}$ ions, said host material being selected from the group consisting of YAG, YSAG and YSGG;
   a dopant of $Cr^{3+}$ ions having an effective percent concentration of between about 0.3% and about 1.5% in said host crystal material; and
   a dopant of $Tm^{3+}$ ions having an effective percent concentration of between about 4.5% and about 7.5% in said host crystal material.

4. A solid state laser material comprising:
   a host crystal material capable of accepting $Cr^{3+}$ ions and $Tm^{3+}$ ions, said host material being YAG;
   a dopant of $Cr^{3+}$ ions having an effective percent concentration of between about 0.6% and about 0.9% in said host crystal material; and
   a dopant of $Tm^{3+}$ ions having an effective percent concentration of between about 5% and about 6% in said host crystal material.

5. A room temperature solid state laser comprising:
   a laser crystal having a host crystal material capable of accepting $Cr^{3+}$ ions and $Tm^{3+}$ ions, a dopant of $Cr^{3+}$ ions having an effective percent concentration in said host crystal material, and a dopant of $Tm^{3+}$ ions having an effective percent concentration in said host crystal material; and
   means for exciting said laser crystal to produce a laser emission at substantially 2 microns at a slope efficiency of at least 2%.

6. A room temperature solid state laser comprising:
   a laser crystal having a host crystal material selected from the group consisting of YAG, YSGG, GSGG, GSAG, YSAG, YAlO, GGG, YGG, LLGG, said host crystal material being doped with an effective percent concentration of $Cr^{3+}$ sensitizer ions and with an effective percent concentration of $Tm^{3+}$ activator ions; and
   means for exciting said laser crystal to produce a laser emission at substantially 2 microns at a slope efficiency of at least 2%.

7. The laser of claim 6 wherein:
   said host crystal material is doped with an effective percent concentration of $Cr^{3+}$ sensitizer ions between 0.3% and 3% and with an effective percent concentration of $Tm^{3+}$ activator ions between 4% and 12% to enable said laser crystal to produce said laser emission at substantially 2 microns at a slope efficiency of at least 2%.

8. The laser of claim 6 wherein:
   said host crystal material is selected from the group consisting of YAG, YSAG and YSGG.

9. The laser of claim 8 wherein:
   said host crystal material is doped with an effective percent concentration of $Cr^{3+}$ sensitizer ions between 0.3% and 1.5% and with an effective percent concentration of $Tm^{3+}$ ions between 4.5% and 7.5% to enable said laser crystal to produce said laser emission at substantially 2 microns at a slope efficiency of substantially 4%.

10. The laser of claim 6 wherein:
    said host crystal material is YAG.

11. The laser of claim 7 wherein:
    said host crystal material is doped with an effective percent concentration of $Cr^{3+}$ sensitizer ions between 0.6% and 0.9% and with an effective percent concentration of $Tm^{3+}$ activator ions between 5% and 6% to enable said laser crystal to produce said laser emission at substantially 2.014 microns at a slope efficiency of substantially 4.5%.

12. The laser of claim 6 wherein:
    said exciting means is a flashlamp.

13. The laser of claim 12 wherein:
    said exciting means is a Xe flashlamp.

14. The laser of claim 6 wherein said crystal laser includes:
    cavity forming means surrounding said host crystal material for forming a resonant laser cavity; and means associated with said cavity forming means for removing laser emission from said resonant laser cavity.

15. The laser of claim 6 wherein:

said $Cr^{3+}$ and $Tm^{3+}$ doped laser crystal is responsive to light from said exciting means for absorbing that light in the $^4T_1$ and $^4T_2$ bands of said $Cr^{3+}$ sensitizer ions, resulting in a nonradiative transfer of the excitation from the thermally mixed $^4T_2/^2E$ levels of the $Cr^{3+}$ sensitizer ions to the $^3F_3$ level of the $Tm^{3+}$ activator ions and a cross-relaxation among the $Tm^{3+}$ activator ions to populate the $^3F_4$ upper laser level to enable said laser crystal to produce a laser emission corresponding to the $^3F_4$–$^3H_6$ laser transition having the wavelength of substantially 2 microns.

16. The laser of claim 6 wherein:

said laser crystal is substantially in the form of a cylindrical laser rod whose long dimension is along the cylinder axis; and said exciting means is a flashlamp having a long dimension along a first axis which is substantially parallel to said cylinder axis of said cylindrical laser rod for enabling said $Cr^{3+}$ ions in said cylindrical laser rod to absorb light from said flashlamp along the long dimension of said laser rod.

17. The laser of claim 16 wherein:

said host crystal material is doped with an effective percent concentration of $Cr^{3+}$ sensitizer ions between 0.3% and 3% and with an effective percent concentration of $Tm^{3+}$ activator ions between 4% and 12% to enable said laser rod to produce said laser emission at substantially 2 microns at a slope efficiency of at least 2%.

18. The laser of claim 16 wherein:

said host crystal material in said laser rod is selected from the group consisting of YAG, YSAG and YSGG.

19. The laser of claim 18 wherein:

said host crystal material is doped with an effective percent concentration of $Cr^{3+}$ sensitizer ions between 0.3% and 1.5% and with an effective percent concentration of $Tm+$ activator ions between 4.5% and 7.5% to enable said laser rod to produce said laser emission at substantially 2 microns at a slope efficiency of substantially 4%.

20. The laser of claim 16 wherein:

said host crystal material in said laser rod is YAG.

21. The laser of claim 20 wherein:

said YAG host crystal material is doped with an effective percent concentration of $Cr^{3+}$ sensitizer ions between 0.6% and 0.9% and with an effective percent concentration of $Tm^{3+}$ activator activator ions between 5% and 6% to enable said laser rod to produce said laser emission at substantially 2.014 microns at a slope efficiency of substantially 4.5% when said laser rod is pumped by light from said flashlamp.

* * * * *